(12) United States Patent
Jeong et al.

(10) Patent No.: US 10,518,731 B2
(45) Date of Patent: Dec. 31, 2019

(54) CENTER AIRBAG APPARATUS

(71) Applicant: Hyundai Mobis Co., Ltd., Seoul (KR)

(72) Inventors: Ga Ram Jeong, Yongin-si (KR); Hae Kwon Park, Yongin-si (KR); Jiwoon Song, Yongin-si (KR); Seokhoon Ko, Yongin-si (KR); Seok Min Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 58 days.

(21) Appl. No.: 15/627,946

(22) Filed: Jun. 20, 2017

(65) Prior Publication Data
US 2017/0369019 A1    Dec. 28, 2017

(30) Foreign Application Priority Data

Jun. 22, 2016  (KR) .................. 10-2016-0078291

(51) Int. Cl.
| | |
|---|---|
| *B60R 21/16* | (2006.01) |
| *B60R 21/2338* | (2011.01) |
| *B60R 21/231* | (2011.01) |
| *B60R 21/20* | (2011.01) |

(52) U.S. Cl.
CPC ............ *B60R 21/16* (2013.01); *B60R 21/231* (2013.01); *B60R 21/20* (2013.01); *B60R 21/2338* (2013.01); *B60R 2021/161* (2013.01); *B60R 2021/23161* (2013.01); *B60R 2021/23386* (2013.01)

(58) Field of Classification Search
CPC ..... B60R 21/16; B60R 21/233; B60R 21/231; B60R 2021/23161; B60R 2021/23324; B60R 2021/23308; B60R 2021/23107; B60R 21/2338; B60R 2021/23386; B60R 2021/161

See application file for complete search history.

(56) References Cited

U.S. PATENT DOCUMENTS

| | | | | |
|---|---|---|---|---|
| 4,262,931 | A * | 4/1981 | Strasser ................ | B60R 21/233 280/729 |
| 5,380,038 | A * | 1/1995 | Hawthorn ............. | B60R 21/233 280/730.1 |
| 5,609,363 | A * | 3/1997 | Finelli ................... | B60R 21/231 280/730.1 |
| 6,786,505 | B2 * | 9/2004 | Yoshida ................ | B60R 21/233 280/729 |
| 9,248,799 | B2 * | 2/2016 | Schneider ............. | B60R 21/205 |
| 9,272,684 | B1 * | 3/2016 | Keyser .................. | B60R 21/237 |
| 9,340,176 | B2 * | 5/2016 | Belwafa ................ | B60R 21/233 |
| 9,522,648 | B2 * | 12/2016 | Fukawatase .......... | B60R 21/233 |
| 2003/0034638 | A1 * | 2/2003 | Yoshida ................ | B60R 21/233 280/729 |

(Continued)

FOREIGN PATENT DOCUMENTS

KR    10-20012-0045647    5/2012

*Primary Examiner* — Karen Beck

(74) *Attorney, Agent, or Firm* — H.C. Park & Associates, PLC

(57) ABSTRACT

A center airbag apparatus may include: an inflator mounted in an instrument panel and configured to inject gas; a first cushion part deployed by the gas injected from the inflator, and configured to support a driver airbag; and a second cushion part connected to the first cushion part, and configured to be deployed between the driver airbag and a passenger airbag to protrude toward the rear of a vehicle based on the driver airbag.

10 Claims, 7 Drawing Sheets

(56) References Cited

U.S. PATENT DOCUMENTS

| | | | | |
|---|---|---|---|---|
| 2007/0246920 | A1* | 10/2007 | Abele | B60R 21/206 |
| | | | | 280/730.1 |
| 2014/0375033 | A1* | 12/2014 | Fukawatase | B60R 21/214 |
| | | | | 280/729 |
| 2015/0166002 | A1* | 6/2015 | Fukawatase | B60R 21/233 |
| | | | | 280/730.1 |
| 2015/0343986 | A1* | 12/2015 | Schneider | B60R 21/205 |
| | | | | 280/729 |
| 2015/0367802 | A1* | 12/2015 | Fukawatase | B60R 21/205 |
| | | | | 280/732 |
| 2016/0039385 | A1* | 2/2016 | Watamori | B60R 21/23138 |
| | | | | 280/730.1 |
| 2016/0046254 | A1* | 2/2016 | Yamada | B60R 21/233 |
| | | | | 280/729 |
| 2016/0046257 | A1* | 2/2016 | Yamada | B60R 21/2338 |
| | | | | 280/729 |
| 2016/0059817 | A1* | 3/2016 | Umehara | B60R 21/233 |
| | | | | 280/729 |
| 2018/0111583 | A1* | 4/2018 | Jaradi | B60R 21/231 |
| 2019/0061670 | A1* | 2/2019 | Jang | B60R 21/233 |

* cited by examiner

US 10,518,731 B2

CENTER AIRBAG APPARATUS

CROSS-REFERENCE TO RELATED APPLICATION

This application claims priority from and the benefit of Korean Patent Application No. 10-2016-0078291, filed on Jun. 22, 2016, which is hereby incorporated by reference for all purposes as if set forth herein.

BACKGROUND

Field

Exemplary embodiments relate to a center airbag apparatus, and more particularly, to a center airbag apparatus which is deployed between a driver airbag and a passenger airbag for preventing an injury to a passenger at a time of a vehicle collision.

Discussion of the Background

An airbag apparatus for a vehicle refers to a safety device that reduces an impact applied to a passenger by deploying a cushion when a collision accident occurs. The airbag apparatus may be divided into a driver airbag (DAB), a passenger airbag (PAB), a side airbag (SAB), a curtain airbag (CAB), a roof airbag (RAB), and the like.

The above information disclosed in this Background section is only for enhancement of understanding of the background of the inventive concepts. Therefore, it may contain information that does not form the prior art that is already known in this country to a person of ordinary skill in the art.

SUMMARY

Exemplary embodiments provide a center airbag apparatus capable of preventing an injury to a passenger when an oblique collision occurs to a vehicle.

In an exemplary embodiment, a center airbag apparatus includes an inflator mounted in an instrument panel and configured to inject a gas; a first cushion part configured to be deployed by the gas injected from the inflator and support a driver airbag; and a second cushion part connected to the first cushion part and configured to be deployed between the driver airbag and a passenger airbag to protrude toward a rear of a vehicle based on the driver airbag.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
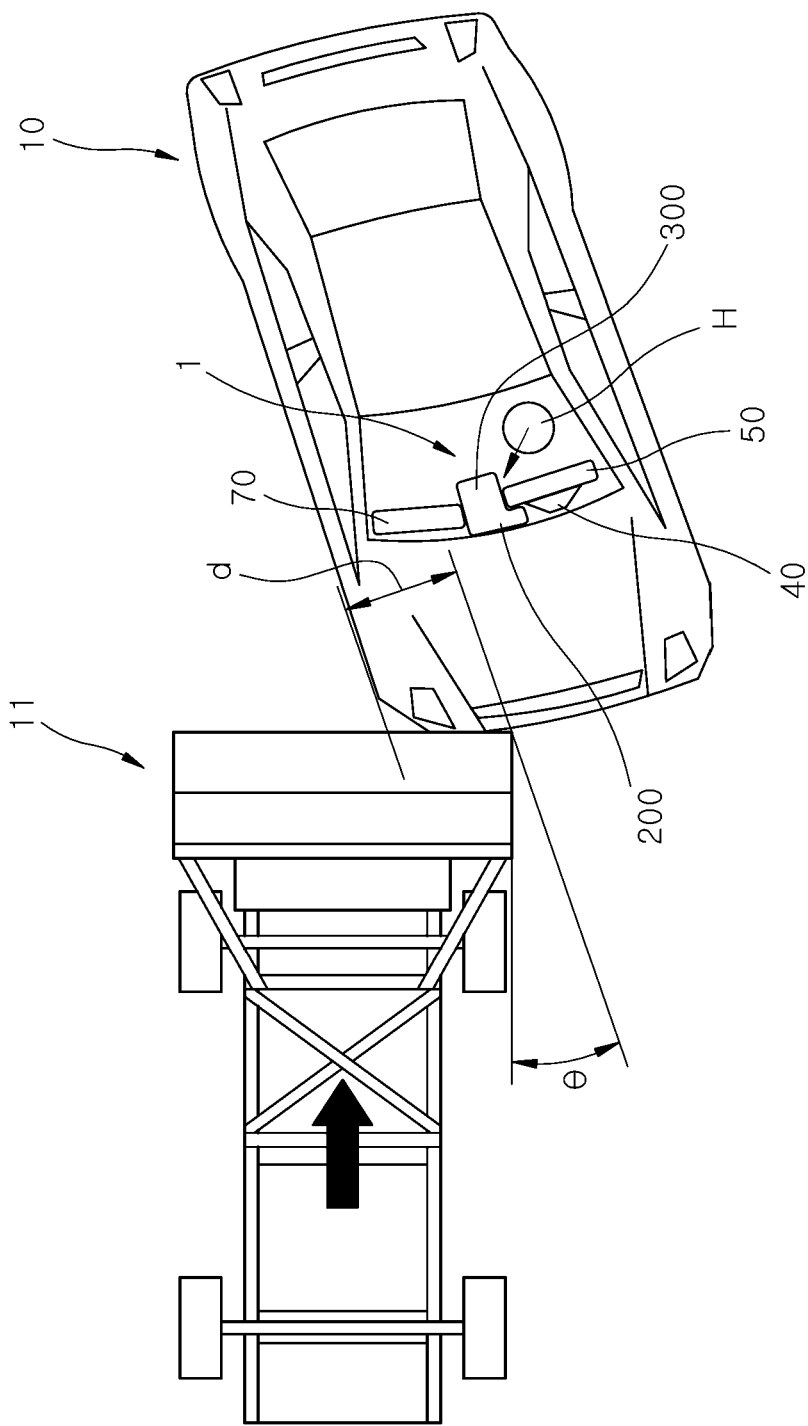
FIG. 1 is a diagram schematically illustrating an oblique collision of a vehicle according to an exemplary embodiment.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Exemplary embodiments will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Generally a driver airbag (DAB), a passenger airbag (PAB), are designed to be deployed toward a passenger for preventing an injury to the passenger when a forward collision occurs to the vehicle. However, when an oblique collision occurs, the passenger may be moved between the DAB and the PAB, and bump into the center fascia. The passenger's head may be moved or turned in a lateral direction. The following exemplary embodiments solve the above-described problem.

Figure 2:
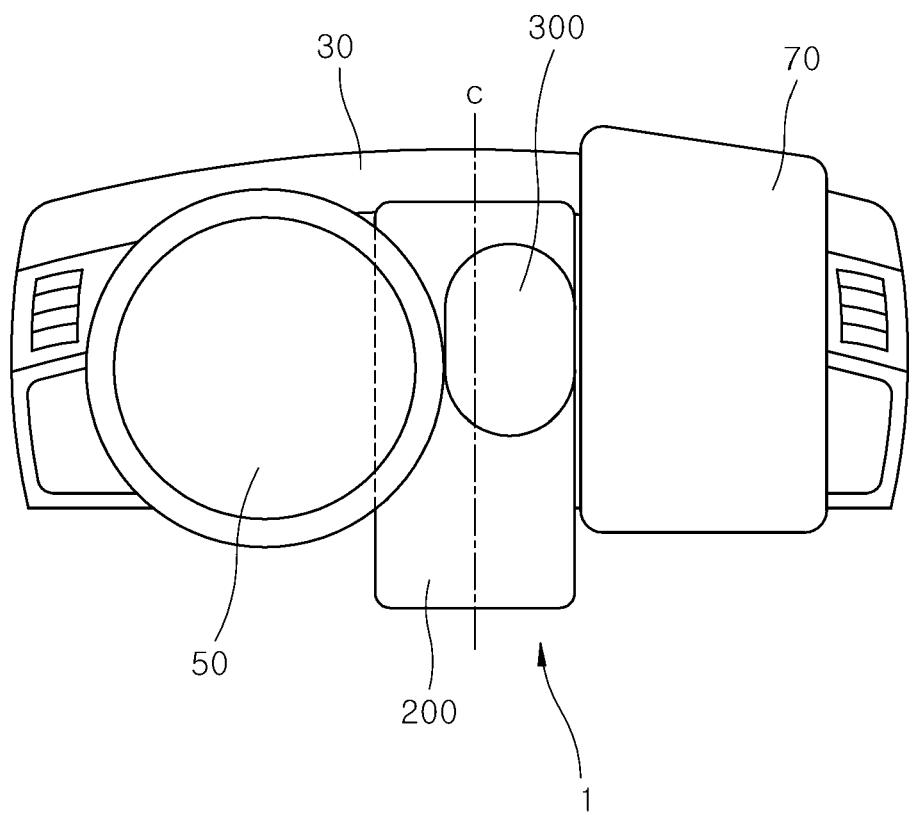
FIG. 2 is a front view illustrating a center airbag apparatus in a deployed state according to an exemplary embodiment.
Figure 3:
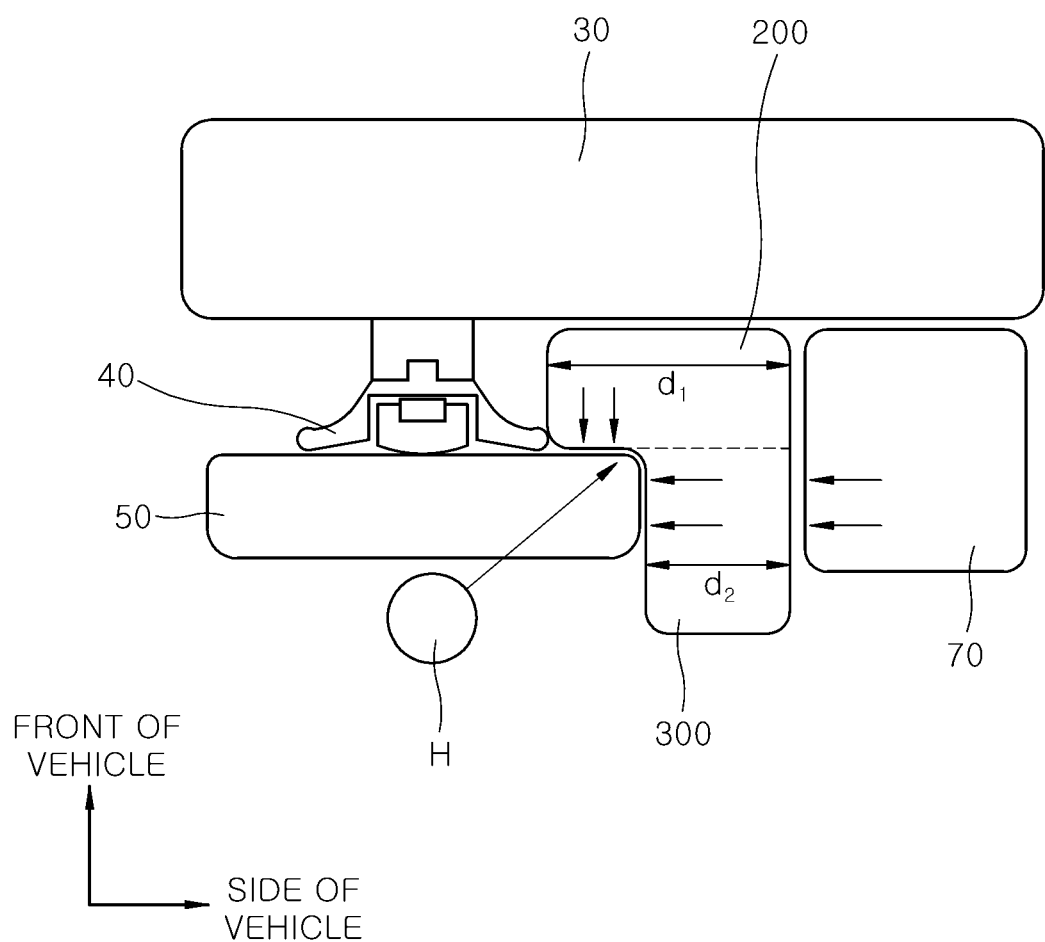
FIG. 3 is a plan view illustrating a center airbag apparatus in a deployed state according to an exemplary embodiment.

FIG. 1 is a diagram schematically illustrating an oblique collision of a vehicle according to an exemplary embodiment. FIG. 2 is a front view illustrating a center airbag apparatus in a deployed state according to an exemplary embodiment. FIG. 3 is a plan view illustrating a center airbag apparatus in a deployed state according to the exemplary embodiment.

Referring to FIGS. 1, 2, and 3, the center airbag apparatus 1 in accordance with an exemplary embodiment may include an inflator 100, a first cushion part 200, and a second cushion part 300. The center airbag apparatus 1 may be deployed between a driver airbag 50 and a passenger airbag 70 for preventing an injury to a passenger or particularly to a driver.

As illustrated in FIG. 1, when the vehicle 10 collides at an oblique angle θ with an obstacle 11 while being offset by a predetermined distance d with respect to the obstacle 11, the passenger or particularly the driver may be moved toward a center fascia (not illustrated) located substantially in the center of an instrument panel 30.

In the present exemplary embodiment, the center airbag apparatus 1 may prevent the head H of the passenger or the driver from moving toward the center fascia, and thereby prevent an injury to the passenger.

Figure 4:
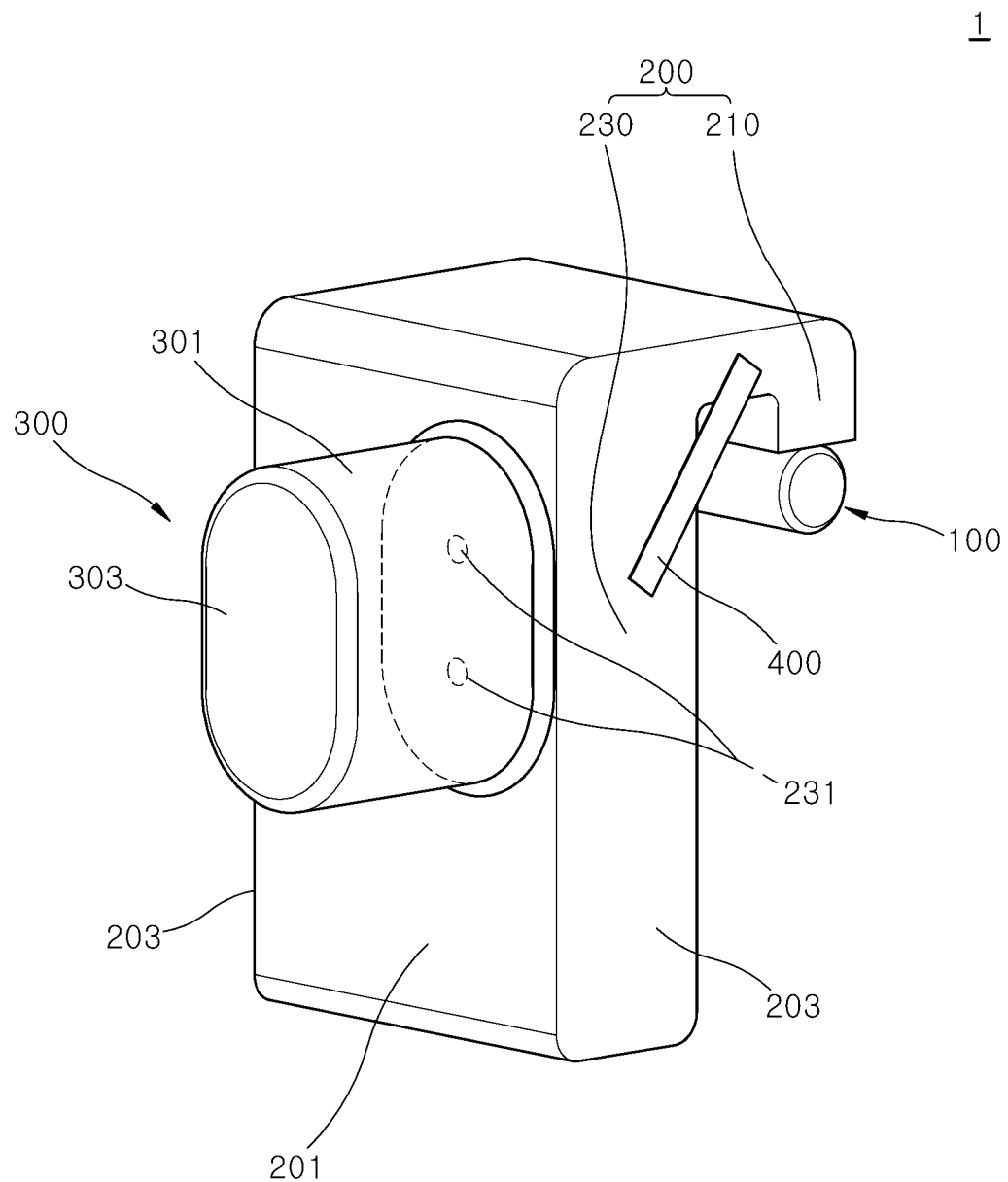
FIG. 4 is a perspective view illustrating a center airbag apparatus in a deployed state according to an exemplary embodiment.

FIG. 4 is a perspective view illustrating the state in which the center airbag apparatus, in accordance with the exemplary embodiment, is deployed. Referring to FIG. 4, the inflator 100 may be installed in the instrument panel 30 or the center fascia (not illustrated). The inflator 100 may be configured to inject a gas into the first cushion part 200 to deploy the first and second cushion parts 200 and 300 in case of an emergency such as a collision or overturn of the vehicle 10.

In the present exemplary embodiment, the inflator 100 may be coupled to the inside of the center fascia or a cowl cross member (not illustrated) through bolting or welding, the cowl cross member being configured to support the instrument panel 30.

In the present exemplary embodiment, the inflator 100 may include an ignition device (not illustrated). As the ignition device ignites powder charge according to a sensing signal from a collision sensor (not illustrated), the inflator 100 may generate a gas and rapidly inject the generated gas into the first cushion part 200. By generating and injecting the gas into first cushion part 200, the first cushion part 200 and the second cushion part 300 connected to and communicating with the first cushion part 200, are deployed.

The first cushion part 200 may be deployed by the gas injected by the inflator 100. The first cushion part 200 is configured to support the driver airbag 50 to prevent the driver airbag 50 from being moved to one side by a load applied from the passenger. Thus, the driver airbag 50 can stably support the passenger. As illustrated in FIG. 4, the first cushion part 200 may include an inflator connection part 210 and a driver airbag support part 230.

The inflator connection part 210 may be connected to the inflator 100 to receive the gas injected from the inflator 100. The inflator connection part 210 may be configured to guide the received gas toward the driver airbag support part 230 to deploy the first cushion part 200.

In an exemplary embodiment, the inflator connection part 210 may connect the driver airbag support part 230 to the inflator 100 installed in the center fascia or the cowl cross member. In particular, the driver airbag support part 230 may be installed and connected so that the driver airbag support part 230 is deployed the outside of the instrument panel 30 or particularly between the passenger airbag 70 and the steering wheel 40.

The cross-sectional area of the inflator connection part 210, through which the gas is supplied, may be set to a smaller value than that of the driver airbag support part 230, such that the gas supplied to the inflator connection part 210 is rapidly transferred to the driver airbag support part 230, and the gas injected from the inflator 100 is mostly used to expand the first and second cushion parts 200 and 300. Thus, the expansion of the first and second cushion parts 200 and 300 may be improved.

The driver airbag support part 230 may be connected to the inflator connection part 210 to facilitate air flow. When the driver airbag support part 230 is deployed, the driver airbag support part 230 may be disposed between the driver airbag 50 and the instrument panel 30, and configured to support the front of the driver airbag 50 (the upper side in FIG. 3).

Therefore, when a load is applied to the driver airbag 50 by a movement of the passenger in an emergency, the driver airbag support part 230 may be deployed to support the front of the driver airbag 50, such that the driver airbag 50 can stably support the passenger.

Figure 5:
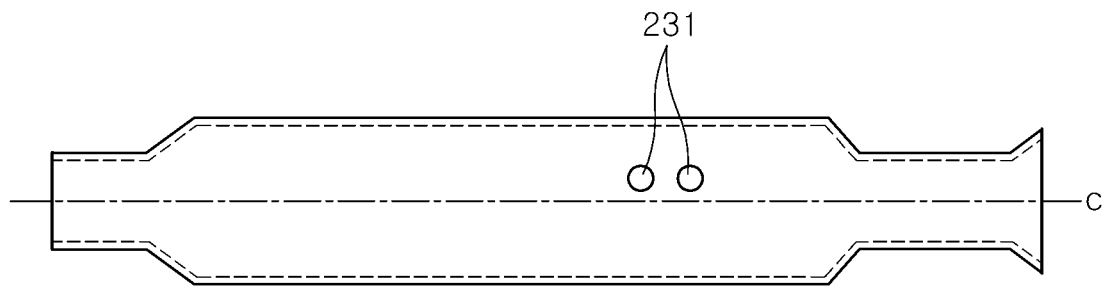
FIG. 5 is a diagram illustrating the state in which a connection hole is applied to a main panel in the center airbag apparatus according to an exemplary embodiment.

FIG. 5 is a diagram illustrating the state in which a connection hole is applied to a main panel in the center airbag apparatus 1 according to an exemplary embodiment.

Referring to FIGS. 4 and 5, the inflator connection part 210 and the driver airbag support part 230 may be integrated by stitching the main panel 201 and a pair of first side panels 203 disposed at both sides of the main panel 201.

The main panel 201 may have connection holes 231 formed therethrough to transfer gas from the first cushion part 200 to the second cushion part 300. The connection holes 231 may be located toward the passenger airbag 70 from a widthwise center c of the main panel 201. Thus, the first cushion part 200 and the second cushion part 300 may be deployed in an L-shape that is concave toward the driver airbag 50, when seen from the top of the vehicle 10.

Therefore, since the driver airbag 50 is disposed in the concave portion which is formed when the first and second cushion parts 200 and 300 are coupled to each other, the driver airbag 50 may be restricted from moving to the side of the passenger airbag 70 or the front of the vehicle 10.

The second cushion part 300 may be connected to the first cushion part 200 and may be deployed between the driver airbag 50 and the passenger airbag 70 so as to restrict a lateral movement of the driver airbag 50.

Figure 6A:
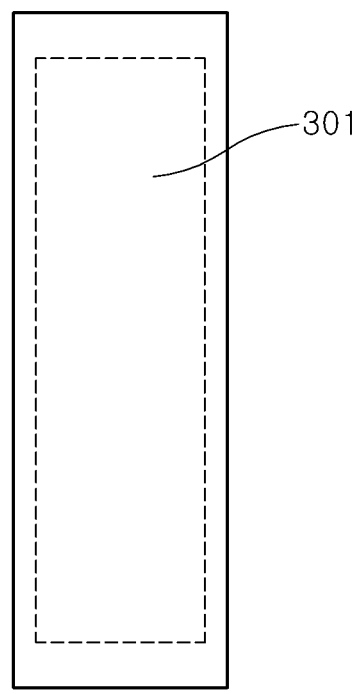
FIGS. 6A and 6B are respective side views of a second side panel and an upper panel illustrating a center airbag apparatus in a deployed state according to an exemplary embodiment.
Figure 6B:
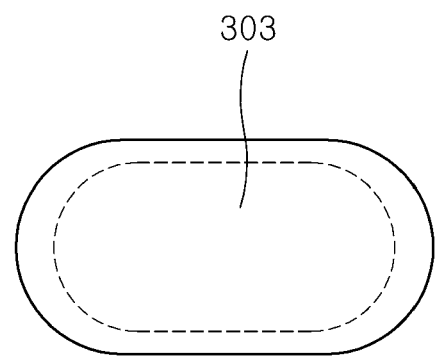

FIGS. 6A and 6B are respective side views of a second side panel and an upper panel illustrating a center airbag apparatus in a deployed state according to an exemplary embodiment.

Referring to FIGS. 6A and 6B, the second cushion part 300 may be connected to the first cushion part 200 so as to receive the gas from the first cushion part 200, and deployed to protrude toward the rear of the vehicle (the lower side in FIG. 3) based on the driver airbag 50.

As illustrated in FIG. 3, a width d2 of the second cushion part 300 may be smaller than a width d1 of the first cushion part 200. When the second cushion part 300 is deployed between the driver airbag 50 and the passenger airbag 70, the second cushion part 300 may prevent the driver airbag 50 from leaning to one side of the passenger airbag 70.

When the second cushion part 300 protrudes further toward the rear of the vehicle 10 than the driver airbag 50, the body or head H of the passenger moving obliquely toward the passenger seat with respect to the front of the vehicle 10 may be caught in the second cushion part 300 in a far-side oblique collision as illustrated in FIG. 1.

Thus, the second cushion part 300 may restrain the body of the passenger, be in contact with the head H of the driver with the driver airbag 50, and prevent the driver from turning his or her head H, thereby reducing the chance of an injury to the driver.

Figure 7:
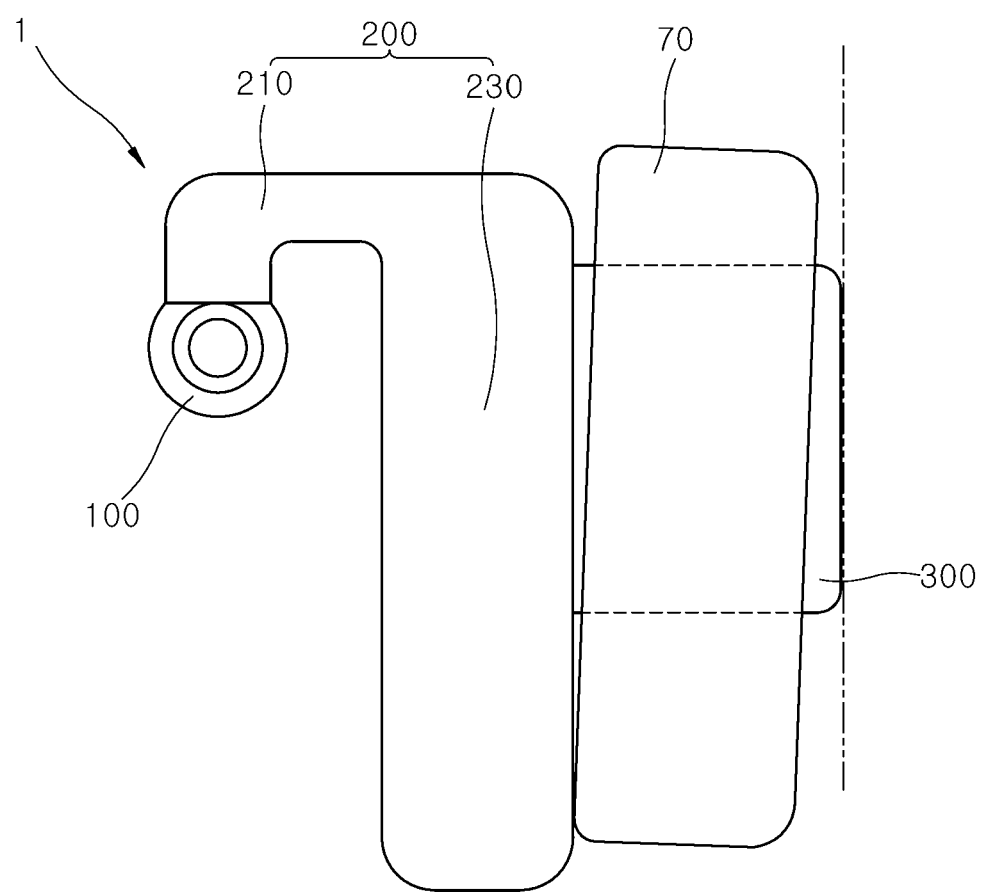
FIG. 7 is a diagram illustrating a structure of a second cushion part in the center airbag apparatus according to an exemplary embodiment.

FIG. 7 is a diagram illustrating the structure of the second cushion part 300 in the center airbag apparatus 1 according to an exemplary embodiment.

Referring to FIGS. 4, 5, 6A, and 6B, the second cushion part 300 may be formed by stitching a second side panel 301 and an upper panel 303. Both ends of the second side panel 301 may be coupled to form a closed loop, and one side of the second side panel 301 may be sewed to the main panel 201 such that one side thereof surrounds the connection holes 231 of the main panel 201.

The upper panel 303 may be sewed to the other side of the second side panel 301 forming the second cushion part 300 with the second side panel 301.

In the present exemplary embodiment, the center airbag apparatus 1 may include a pair of turn angle restriction tethers 400 on the upper sides of the pair of the first side panels 203. Each of the turn angle restriction tethers comprises a first end and a second end respectively connected to the driver airbag support part and inflator connection part via stitching. That is, the first end the turn angle restriction tether 400 may be sewed (i.e., connected via stitching) to the driver support part 230 and the second end may be sewed to the inflator connection part 210.

Thus, the turn angle restriction tethers 400 may restrict the deployment direction of the driver airbag support part 230 with respect to the inflator connection part 210, such that the driver airbag support part 230 is deployed downward. Furthermore, the turn angle restriction tethers 400 may prevent the driver airbag support part 230 from turning in a direction away from the instrument panel 30.

Hereafter, the operation principle and effect of the center airbag apparatus 1 in accordance with the exemplary embodiment will be described as follows.

During an collision, for example, when an impact equal to or more than a preset value is applied to the vehicle 10 or the vehicle 10 is overturned, the collision sensor may sense the emergency, and a control unit (controller, not illustrated) of the vehicle 10 may control the inflator 100 to inject gas.

The gas injected by the inflator 100 may deploy the first cushion part 200. Specifically, the gas injected by the inflator 100 may be transferred to the driver airbag support part 230 through the inflator connection part 210, and increase the internal pressure of the inflator connection part 210 and the driver airbag support part 230, thereby expanding the inflator connection part 210 and the driver airbag support part 230.

The exploded and deployed driver airbag support part 230 may be inserted between the driver airbag 50 and the instrument panel 30, and may support the driver airbag support part 230 when the driver airbag support part 230 is pressurized by a passenger, thereby stably supporting the passenger.

The second cushion part 300 may be deployed by gas received from the first cushion part 200. Specifically, since the second cushion part 300 is connected to and communicates with the first cushion part 200 through the connection holes 231 formed in the driver airbag support part 230, the second cushion part 300 may be expanded by the gas transferred from the driver airbag support part 230, and deployed between the driver airbag 50 and the passenger airbag 70.

When the second cushion part 300 is deployed between the driver airbag 50 and the passenger airbag 70, the second cushion part 300 may form an L-shape with the driver airbag support part 230, such that the driver airbag 50 is disposed in the concave portion. Thus, the second cushion part 300 may restrict the movement of the driver airbag 50 and stably support the passenger. Furthermore, since the second cushion part 300 is deployed between the driver airbag 50 and the passenger airbag 70 with the driver airbag support part 230, the second cushion part 300 may prevent the head H of the passenger from bumping into the center fascia.

In the present exemplary embodiment, since the second cushion part 300 is deployed to protrude further toward the rear of the vehicle 10 than the driver airbag 50, the second cushion part 300 may prevent the head H of the driver from moving toward the passenger airbag 70. Furthermore, the second cushion part 300 and the driver airbag 50 may be in frictional contact with the head H of the driver, thereby preventing the head H of the driver from turning.

Thus, the center airbag apparatus 1 may be deployed between the driver airbag 50 and the passenger airbag 70, and prevent the passenger from bumping into the center fascia or the like.

Furthermore, the second cushion part 300 of the center airbag apparatus 1 may protrude further toward the rear of the vehicle 10 than the driver airbag 50 and may block the head H of the passenger from moving in the lateral direction. The second cushion part 300 may also prevent the head H of the passenger from turning, thereby reducing an injury to the passenger.

Furthermore, the first and second cushion parts 200 and 300 of the center airbag apparatus 1 may restrict the movement of the driver airbag 50 such that the driver airbag 50 can stably support the passenger.

Although preferred exemplary embodiments have been disclosed for illustrative purposes, those skilled in the art will appreciate that various modifications, additions and substitutions are possible, without departing from the scope and spirit of the invention as defined in the accompanying claims.

What is claimed is:

1. A center airbag apparatus, comprising:
    an inflator mounted in an instrument panel and configured to inject a gas;
    a first cushion part configured to be deployed by the gas injected from the inflator and support a driver airbag, wherein the first cushion part comprises:
        an inflator connection part connected to the inflator and configured to guide the gas injected by the inflator; and
        a driver airbag support part configured to communicate with the inflator connection part and configured to be deployed and disposed between the driver airbag and the instrument panel to support the driver airbag;
    a second cushion part connected to the first cushion part and configured to be deployed between the driver airbag and a passenger airbag and to protrude toward a rear of a vehicle relative to the driver airbag; and
    a turn angle restriction tether having a first end coupled to the driver airbag support part and a second end coupled to the inflator connection part, wherein the turn angle restriction tether is configured to restrict a deployment direction of the driver airbag support part, such that the driver airbag support part is deployed downward, wherein the turn angle restriction tether is disposed on an outside of the first cushion part and between the center airbag apparatus and the passenger airbag.

2. The center airbag apparatus of claim 1, wherein the inflator connection part connects the inflator to the driver airbag support part such that the driver airbag support part is deployed between the passenger airbag and a steering wheel.

3. The center airbag apparatus of claim 2, wherein a cross-sectional area of the inflator connection part is smaller than that of the driver airbag support part.

4. The center airbag apparatus of claim 2, wherein the inflator connection part and the driver airbag support part are integrated by stitching between a main panel and a pair of first side panels disposed at both sides of the main panel.

5. The center airbag apparatus of claim 4, wherein the main panel has a connection hole formed in a surface of the main panel to transfer the gas from the first cushion part to the second cushion part.

6. The center airbag apparatus of claim 1, wherein the driver airbag support part has a connection hole formed in a surface of the driver airbag support part, and the second cushion part is deployed by the gas supplied through the connection hole.

7. The center airbag apparatus of claim 1, wherein the first end of the turn angle restriction tether is connected to the driver airbag support part via stitching and the second end of the turn angle restriction tether is connected to the inflator connection part via stitching.

8. The center airbag apparatus of claim 7, wherein the turn angle restriction tether comprises a pair of turn angle restriction tethers each with the first end and the second end respectively connected to the driver airbag support part and the inflator connection part via stitching.

9. The center airbag apparatus of claim 1, wherein a width of the second cushion part is smaller than a width of the first cushion part.

10. The center airbag apparatus of claim 1, wherein the second cushion part is disposed offset toward the passenger airbag relative to a widthwise center of the first cushion part.

\* \* \* \* \*